United States Patent
Janakiraman et al.

(10) Patent No.: US 11,661,891 B1
(45) Date of Patent: May 30, 2023

(54) SURFACE WITH SHAPE MEMORY ALLOY PARTICLES

(71) Applicant: General Electric Company, Schenectady, NY (US)

(72) Inventors: Narayanan Janakiraman, Bengaluru (IN); Paul Mathew, Bengaluru (IN); Sreerama Prasad Ramaswamy, Bengaluru (IN); Hiranya Nath, Bengaluru (IN); Ravindra Shankar Ganiger, Bengaluru (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/814,334

(22) Filed: Jul. 22, 2022

(30) Foreign Application Priority Data

Mar. 31, 2022 (IN) .............................. 202211019499

(51) Int. Cl.
*F02C 7/30* (2006.01)
*F02C 7/22* (2006.01)

(52) U.S. Cl.
CPC ................ *F02C 7/30* (2013.01); *F02C 7/222* (2013.01); *F05D 2220/323* (2013.01); *F05D 2260/95* (2013.01); *F05D 2300/505* (2013.01); *F05D 2300/6111* (2013.01)

(58) Field of Classification Search
CPC ....... F02C 7/30; F02C 7/222; F05D 2220/323
See application file for complete search history.

(56) References Cited

U.S. PATENT DOCUMENTS

| | | | |
|---|---|---|---|
| 5,725,955 A | 3/1998 | Tawil et al. | |
| 5,829,246 A | 11/1998 | Abrams et al. | |
| 6,125,624 A | 10/2000 | Prociw | |
| 6,431,837 B1 | 8/2002 | Velicki | |
| 6,523,350 B1 | 2/2003 | Mancini et al. | |
| 6,579,628 B2 | 6/2003 | Takeuchi et al. | |
| 6,715,292 B1 | 4/2004 | Hoke | |
| 6,808,816 B2 | 10/2004 | Mancini et al. | |
| 6,989,197 B2 | 1/2006 | Schneider | |

(Continued)

FOREIGN PATENT DOCUMENTS

| | | |
|---|---|---|
| CN | 103977996 B | 4/2016 |
| CN | 109070152 A | 12/2018 |

(Continued)

OTHER PUBLICATIONS

Eftifeeva et al., "Two-way shape memory effect in [001]B2-oriented Co—Ni—Al single crystals", Materials Today Proceedings 4, 2017, pp. 4789-4796.

(Continued)

*Primary Examiner* — Long T Tran
(74) *Attorney, Agent, or Firm* — Venable LLP; David D. Leege; Michele V. Frank (57) ABSTRACT

A component susceptible to the formation of deposits, such as a component of a hydrocarbon system in a gas turbine engine. The component includes a substrate having a surface susceptible to the formation of a deposit thereon. A shape memory alloy coating is formed on the surface of the substrate. The shape memory alloy coating is a plurality of particles formed on the surface, and each particle of the plurality of particles is formed from a shape memory alloy.

20 Claims, 9 Drawing Sheets

(56) References Cited

U.S. PATENT DOCUMENTS

| | | | |
|---|---|---|---|
| 7,326,469 B2 | 2/2008 | Dye et al. | |
| 7,431,981 B2 | 10/2008 | Schneider | |
| 8,104,793 B2 | 1/2012 | Browne et al. | |
| 8,177,488 B2 | 5/2012 | Manteiga et al. | |
| 8,291,710 B2 | 10/2012 | Webster | |
| 8,298,656 B2 | 10/2012 | Schneider | |
| 8,529,849 B2 | 9/2013 | Pranda et al. | |
| 9,062,563 B2 | 6/2015 | Varanasi et al. | |
| 9,341,117 B2 | 5/2016 | Remer et al. | |
| 9,482,105 B1* | 11/2016 | Gorokhovsky | C23C 28/36 |
| 10,100,944 B2 | 10/2018 | Calkins et al. | |
| 10,196,934 B2 | 2/2019 | Khan et al. | |
| 10,683,807 B2 | 6/2020 | McMasters et al. | |
| 11,143,170 B2 | 10/2021 | Foutch | |
| 2010/0266770 A1 | 10/2010 | Mazany et al. | |
| 2017/0030204 A1* | 2/2017 | Gorokhovsky | C23C 28/345 |
| 2017/0254208 A1* | 9/2017 | Prince | B29C 65/48 |
| 2017/0314118 A1* | 11/2017 | Shen | C23C 24/04 |
| 2017/0370376 A1 | 12/2017 | Kray et al. | |
| 2019/0195132 A1* | 6/2019 | Tajiri | F28F 7/02 |
| 2021/0017881 A1* | 1/2021 | Diaz | B22F 5/009 |
| 2021/0040864 A1* | 2/2021 | Ganiger | F16C 19/26 |

FOREIGN PATENT DOCUMENTS

| | | |
|---|---|---|
| CN | 111303847 A | 6/2020 |
| CN | 113532189 A | 10/2021 |
| GB | 2555598 A | 5/2018 |
| JP | 2015014265 A | 1/2015 |
| WO | 2020243394 A1 | 12/2020 |

OTHER PUBLICATIONS

Dilibal et al., "On the volume change in Co—Ni—Al during pseudoelasticity", Materials Science and Engineering A 528, 2011, pp. 2875-2881.

Li et al., "Martensitic transformation and magnetization of Ni—Fe—Ga ferromagnetic shape memory alloys", Scripta Materialia 48, 2003, pp. 1255-1258.

Sun et al., "Giant negative thermal expansion in Fe—Mn—Ga magnetic shape memory alloys", Applied Physics Letters 113, 2018, pp. 041903-1-041903-5.

Kireeva et al., "Effect of oriented precipitates on shape memory effect and superelasticity in Co—Ni—Ga single crystals", Acta Materialia 68, 2014, pp. 127-139.

Seldin "Stress-Strain Properties of Polycrystalline Graphites in Tension and Compression at Room Temperature", Carbon, vol. 4, 1966, pp. 177-191.

Uchil et al., "Thermal expansion in various phases of Nitinol using TMA", Physica B: Condensed Matter, vol. 270, Issues 3-4, Oct. 1999, pp. 289-297.

* cited by examiner

SURFACE WITH SHAPE MEMORY ALLOY PARTICLES

CROSS REFERENCE TO RELATED APPLICATIONS

The present application claims the benefit of Indian Patent Application No. 202211019499, filed on Mar. 31, 2022, which is hereby incorporated by reference herein in its entirety.

TECHNICAL FIELD

The present disclosure relates to surfaces susceptible to the formation of deposits, particularly surfaces contacting a hydrocarbon fluid in gas turbine engines for aircraft.

BACKGROUND

Gas turbine engines include surfaces that contact hydrocarbon fluids, such as fuels and lubricating oils. Carbonaceous deposits (also known as coke) may form on these surfaces when exposed to the hydrocarbon fluids at elevated temperatures, resulting in carbon becoming attached to these surfaces and building up as deposits on these surfaces.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, the following detailed descriptions are exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially" is not to be limited to the precise value specified. In at least some instances, the approximating language may correspond to the precision of an instrument for measuring the value, or the precision of the methods or the machines for constructing or manufacturing the components and/or systems. For example, the approximating language may refer to being within a one, two, four, ten, fifteen, or twenty percent margin in either individual values, range(s) of values, and/or endpoints defining range(s) of values.

Here, and throughout the specification and claims, range limitations are combined and interchanged. Such ranges are identified and include all the sub-ranges contained therein unless the context or the language indicates otherwise. For example, all ranges disclosed herein are inclusive of the endpoints, and, when multiple ranges are provided, the endpoints of each range may be independently combinable with each other.

As noted above, coke deposition may occur on surfaces of a gas turbine engine that are exposed to hydrocarbon fluids, such as fuels and lubricating oils, at elevated temperatures. On such surfaces, coke can build up in considerable thickness, restricting or even blocking the fluid flow in such passages. In other situations, large pieces of coke can shed off these surfaces causing blockages or even damage to downstream components. In some components, these deposits can be removed by periodic maintenance, such as cleaning or replacement of the component. Such maintenance, however, can be expensive and time consuming, and there may be some components where such maintenance is not possible. The embodiments discussed herein employ a coating of shape memory alloy (SMA) particles (SMA coating) to avoid the buildup of such deposits by breaking up the deposits as they form, so that the deposits can be removed by the natural fluid flow past the surface. This is referred to herein as a self-cleaning effect.

Figure 1:
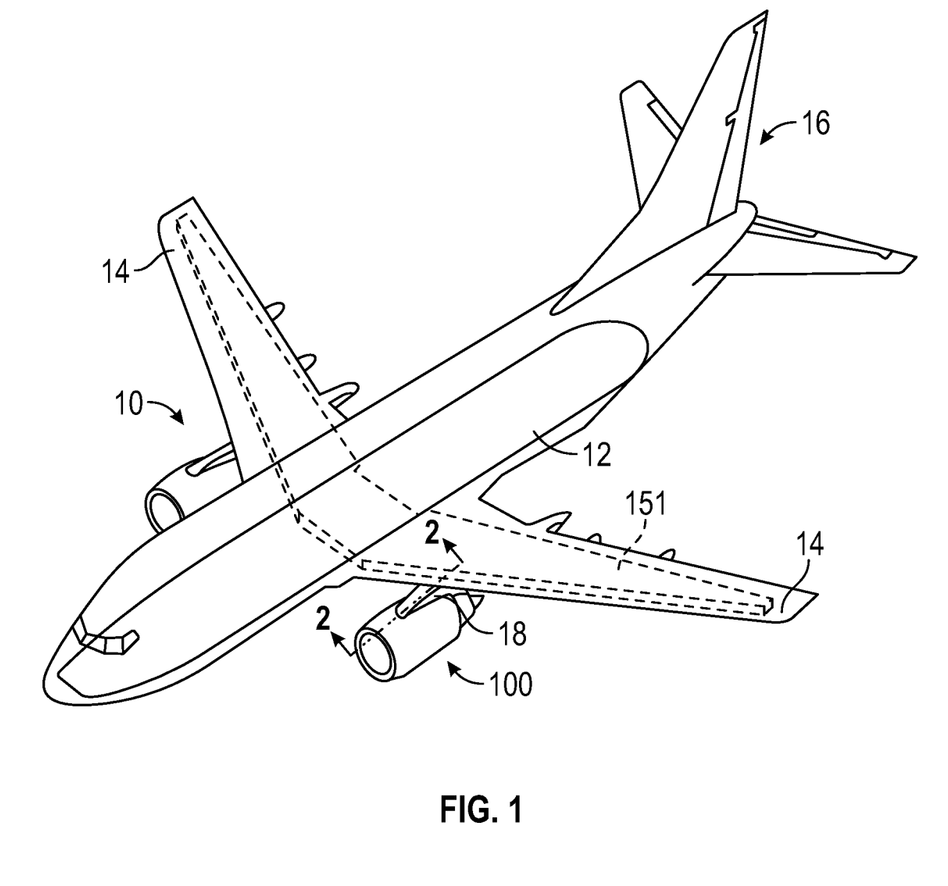
FIG. 1 is a schematic perspective view of an aircraft having a gas turbine engine.

The SMA coating discussed herein is particularly suitable for use in engines, such as a gas turbine engine used on an aircraft. FIG. 1 is a perspective view of an aircraft 10 that may implement various preferred embodiments. The aircraft 10 includes a fuselage 12, wings 14 attached to the fuselage 12, and an empennage 16. The aircraft 10 also includes a propulsion system that produces a propulsive thrust required to propel the aircraft 10 in flight, during taxiing operations, and the like. The propulsion system for the aircraft 10 shown in FIG. 1 includes a pair of engines 100. In this embodiment, each engine 100 is attached to one of the wings 14 by a pylon 18 in an under-wing configuration. Although the engines 100 are shown attached to the wing 14 in an under-wing configuration in FIG. 1, in other embodiments, the engine 100 may have alternative configurations and be coupled to other portions of the aircraft 10. For example, the engine 100 may additionally or alternatively include one or more aspects coupled to other parts of the aircraft 10, such as, for example, the empennage 16, and the fuselage 12.

As will be described further below with reference to FIG. 2, the engines 100 shown in FIG. 1 are gas turbine engines that are each capable of selectively generating a propulsive thrust for the aircraft 10. The amount of propulsive thrust may be controlled at least in part based on a volume of fuel provided to the gas turbine engines 100 via a fuel system 150 (see FIG. 2). An aviation turbine fuel in the embodiments discussed herein is a combustible hydrocarbon liquid fuel, such as a kerosene-type fuel, having a desired carbon number. The fuel is stored in a fuel tank 151 of the fuel system 150. As shown in FIG. 1, at least a portion of the fuel tank 151 is located in each wing 14 and a portion of the fuel tank 151 is located in the fuselage 12 between the wings 14. The fuel tank 151, however, may be located at other suitable locations in the fuselage 12 or the wing 14. The fuel tank 151 may also be located entirely within the fuselage 12 or the wing 14. The fuel tank 151 may also be separate tanks instead of a single, unitary body, such as, for example, two tanks each located within a corresponding wing 14.

Although the aircraft 10 shown in FIG. 1 is an airplane, the embodiments described herein may also be applicable to other aircraft 10, including, for example, helicopters and unmanned aerial vehicles (UAV). Further, although not depicted herein, in other embodiments, the gas turbine engine may be any other suitable type of gas turbine engine, such as an industrial gas turbine engine incorporated into a power generation system, a nautical gas turbine engine, etc.

Figure 2:
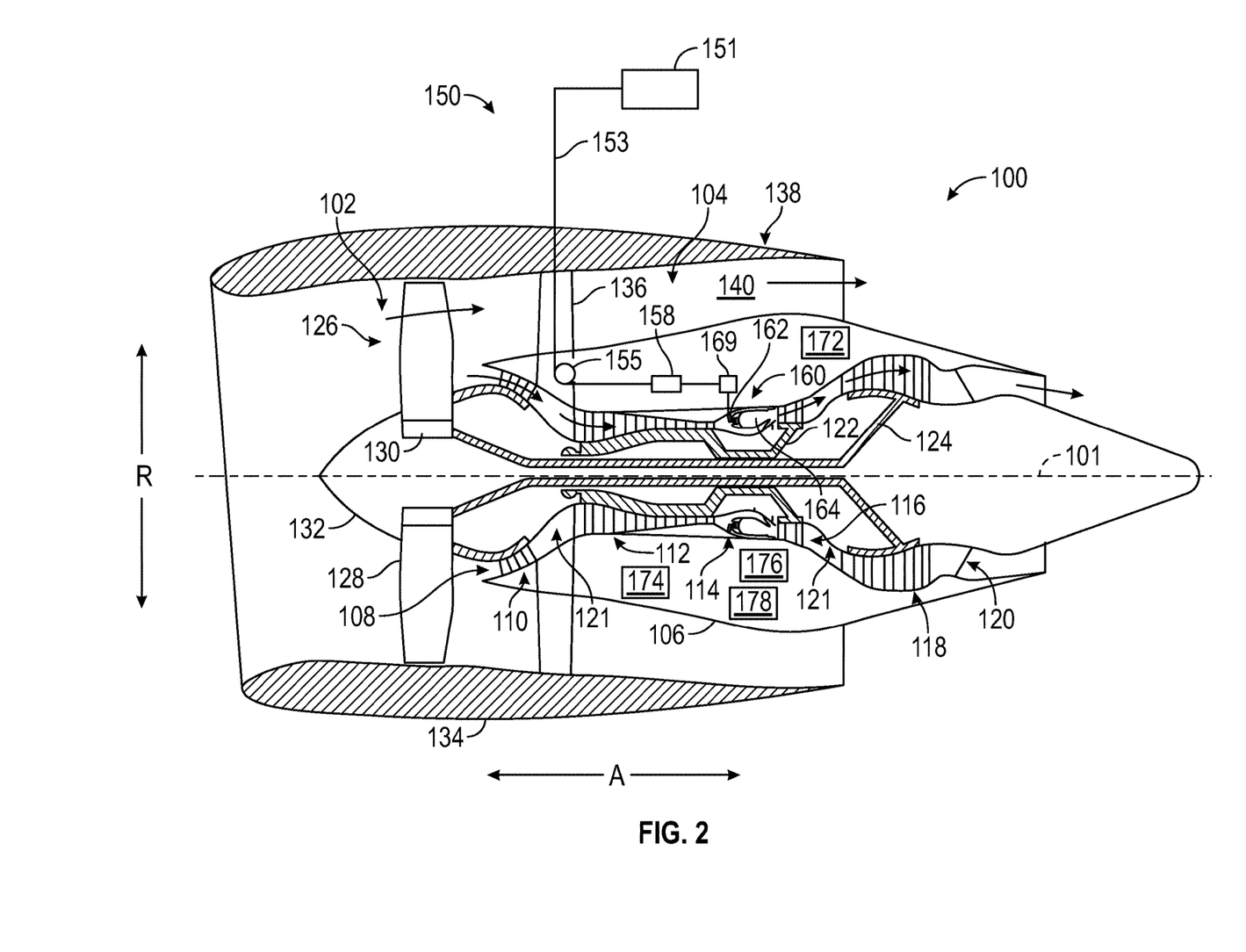
FIG. 2 is a schematic, cross-sectional view, taken along line 2-2 in FIG. 1, of the gas turbine engine of the aircraft shown in FIG. 1.

FIG. 2 is a schematic, cross-sectional view of one of the engines 100 used in the propulsion system for the aircraft 10 shown in FIG. 1. The cross-sectional view of FIG. 2 is taken along line 2-2 in FIG. 1. For the embodiment depicted in FIG. 2, the engine 100 is a high bypass turbofan engine. The engine 100 may also be referred to as a turbofan engine 100 herein. The turbofan engine 100 has an axial direction A (extending parallel to a longitudinal centerline 101, shown for reference in FIG. 2), a radial direction R, and a circumferential direction. The circumferential direction (not depicted in FIG. 2) extends in a direction rotating about the axial direction A. The turbofan engine 100 includes a fan section 102 and a turbomachine 104 disposed downstream from the fan section 102.

The turbomachine 104 depicted in FIG. 2 includes a tubular outer casing 106 (also referred to as a housing or a nacelle) that defines an inlet 108. In this embodiment, the inlet 108 is annular. The outer casing 106 encases an engine core that includes, in a serial flow relationship, a compressor section including a booster or a low-pressure (LP) compressor 110 and a high-pressure (HP) compressor 112, a combustion section 114, a turbine section including a high-pressure (HP) turbine 116 and a low-pressure (LP) turbine 118, and a jet exhaust nozzle section 120. The compressor section, the combustion section 114, and the turbine section together define at least in part a core air flowpath 121 extending from the inlet 108 to the jet exhaust nozzle section 120. The turbofan engine further includes one or more drive shafts. More specifically, the turbofan engine includes a high-pressure (HP) shaft or a spool 122 drivingly connecting the HP turbine 116 to the HP compressor 112, and a low-pressure (LP) shaft or a spool 124 drivingly connecting the LP turbine 118 to the LP compressor 110.

The fan section 102 shown in FIG. 2 includes a fan 126 having a plurality of fan blades 128 coupled to a disk 130. The fan blades 128 and the disk 130 are rotatable, together, about the longitudinal centerline (axis) 101 by the LP shaft 124. The LP compressor 110 may also be directly driven by the LP shaft 124, as depicted in FIG. 2. The disk 130 is covered by a rotatable front hub 132 aerodynamically contoured to promote an airflow through the plurality of fan blades 128. Further, an annular fan casing or an outer nacelle 134 circumferentially surrounds the fan 126 and/or at least a portion of the turbomachine 104. The nacelle 134 is supported relative to the turbomachine 104 by a plurality of circumferentially spaced outlet guide vanes 136. A downstream section 138 of the nacelle 134 extends over an outer portion of the turbomachine 104 so as to define a bypass airflow passage 140 therebetween.

The turbofan engine 100 is operable with the fuel system 150 and receives a flow of fuel from the fuel system 150. The fuel system 150 includes a fuel delivery assembly 153 providing the fuel flow from the fuel tank 151 to the turbofan engine 100, and, more specifically, to a plurality of fuel nozzles 162 that inject fuel into a combustion chamber 164 of a combustor 160 (see FIG. 3, discussed further below) of the combustion section 114. The components of the fuel system 150, and, more specifically, the fuel tank 151, is an example of a fuel source that provides fuel to the fuel nozzles 162, as discussed in more detail below. The fuel delivery assembly 153 includes tubes, pipes, conduits, and the like, to fluidly connect the various components of the fuel system 150 to the engine 100. The fuel tank 151 is configured to store the hydrocarbon fuel, and the hydrocarbon fuel is supplied from the fuel tank 151 to the fuel delivery assembly 153. The fuel delivery assembly 153 is configured to carry the hydrocarbon fuel between the fuel tank 151 and the engine 100 and, thus, provides a flow path (fluid pathway) of the hydrocarbon fuel from the fuel tank 151 to the engine 100.

The fuel system 150 includes at least one fuel pump fluidly connected to the fuel delivery assembly 153 to induce the flow of the fuel through the fuel delivery assembly 153 to the engine 100. One such pump is a main fuel pump 155. The main fuel pump 155 is a high-pressure pump that is the primary source of pressure rise in the fuel delivery assembly 153 between the fuel tank 151 and the engine 100. The main fuel pump 155 may be configured to increase a pressure in the fuel delivery assembly 153 to a pressure greater than a pressure within the combustion chamber 164 of the combustor 160.

The fuel system 150 also includes a fuel metering unit 158 in fluid communication with the fuel delivery assembly 153. Any suitable fuel metering unit 158 may be used including, for example, a metering valve. The fuel metering unit 157 is positioned downstream of the main fuel pump 155 and upstream of a fuel manifold 159 configured to distribute fuel to the fuel nozzles 162. The fuel system 150 is configured to provide the fuel to the metering unit 157, and the fuel metering unit 157 is configured to receive fuel from the fuel tank 151. The fuel metering unit 158 is further configured to provide a flow of fuel to the engine 100 in a desired manner. More specifically, the fuel metering unit 158 is configured to meter the fuel and to provide a desired volume of fuel, at, for example, a desired flow rate, to the fuel manifold 169 of the engine 100. The fuel manifold 169 is fluidly connected to the fuel nozzles 162 and distributes (provides) the fuel received to the plurality of fuel nozzles 162, where the fuel is injected into the combustion chamber 164 and combusted. Adjusting the fuel metering unit 158 changes the volume of fuel provided to the combustion chamber 164 and, thus, changes the amount of propulsive thrust produced by the engine 100 to propel the aircraft 10.

The turbofan engine 100 also includes various accessory systems to aid in the operation of the turbofan engine 100 and/or an aircraft, including the turbofan engine 100. For example, the turbofan engine 100 may include a main lubrication system 172, a compressor cooling air (CCA) system 174, an active thermal clearance control (ATCC) system 176, and a generator lubrication system 178, each of which is depicted schematically in FIG. 2. The main lubrication system 172 is configured to provide a lubricant to, for example, various bearings and gear meshes in the compressor section, the turbine section, the HP spool 122, and the LP shaft 124. The lubricant provided by the main lubrication system 172 may increase the useful life of such components and may remove a certain amount of heat from such components through the use of one or more heat exchangers. The compressor cooling air (CCA) system 174 provides air from one or both of the HP compressor 112 or the LP compressor 110 to one or both of the HP turbine 116 or the LP turbine 118. The active thermal clearance control (ATCC) system 176 acts to minimize a clearance between tips of turbine blades and casing walls as casing temperatures vary during a flight mission. The generator lubrication system 178 provides lubrication to an electronic generator (not shown), as well as cooling/heat removal for the electronic generator. The electronic generator may provide electrical power to, for example, a startup electrical motor for the turbofan engine 100 and/or various other electronic components of the turbofan engine 100 and/or an aircraft including the turbofan engine 100. The lubrication systems for the engine 100 (e.g., the main lubrication system 172 and the generator lubrication system 178) may use hydrocarbon fluids, such as oil, for lubrication, in which the oil circulates through inner surfaces of oil scavenge lines.

The turbofan engine 100 discussed herein is, of course, provided by way of example only. In other embodiments, any other suitable engine may be utilized with aspects of the present disclosure. For example, in other embodiments, the engine may be any other suitable gas turbine engine, such as a turboshaft engine, a turboprop engine, a turbojet engine, an unducted single fan engine, and the like. In such a manner, it will further be appreciated that, in other embodiments, the gas turbine engine may have other suitable configurations, such as other suitable numbers or arrangements of shafts, compressors, turbines, fans, etc. Further, although the turbofan engine 100 is shown as a direct drive, fixed-pitch turbofan engine 100, in other embodiments, a gas turbine engine may be a geared gas turbine engine (i.e., including a gearbox between the fan 126 and a shaft driving the fan, such as the LP shaft 124), may be a variable pitch gas turbine engine (i.e., including a fan 126 having a plurality of fan blades 128 rotatable about their respective pitch axes), etc. Further, still, in alternative embodiments, aspects of the present disclosure may be incorporated into, or otherwise utilized with, any other type of engine, such as reciprocating engines. Additionally, in still other exemplary embodiments, the exemplary turbofan engine 100 may include or be operably connected to any other suitable accessory systems. Additionally, or alternatively, the exemplary turbofan engine 100 may not include, or be operably connected to, one or more of the accessory systems 172, 174, 176, and 178, discussed above.

Figure 3:
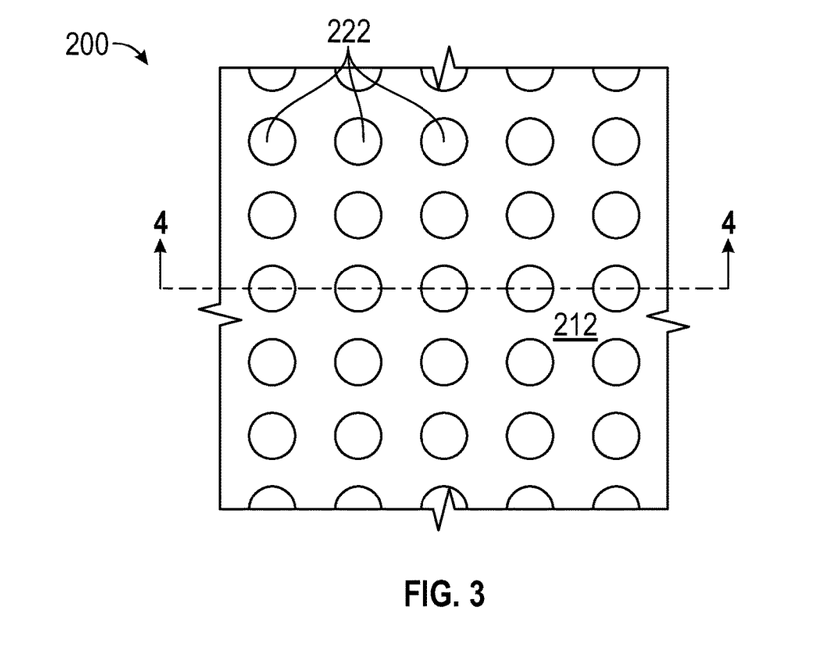
FIG. 3 shows a surface of a component of the gas turbine engine shown in FIG. 2 including a shape memory alloy (SMA) coating according to an embodiment of the present disclosure.
Figure 4:
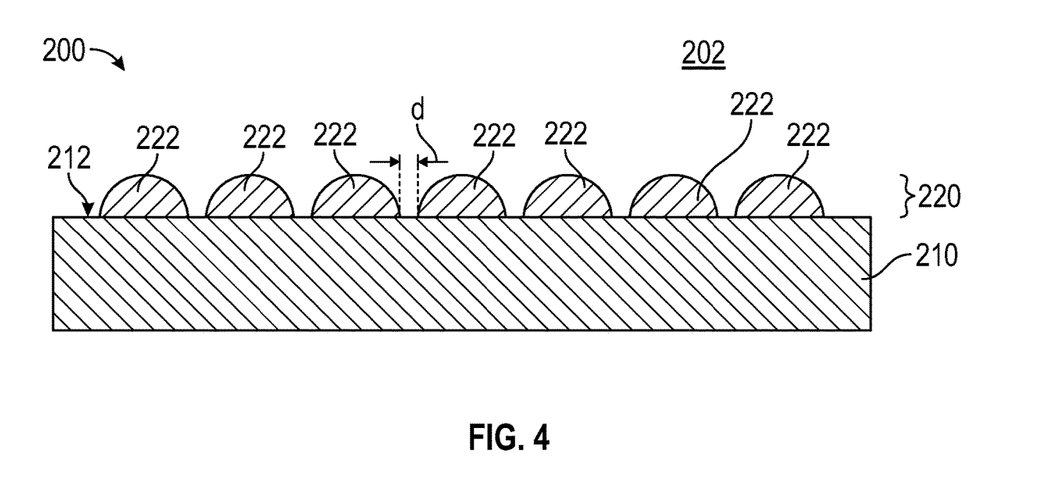
FIG. 4 is a cross-sectional view of the component with the SMA coating shown in FIG. 3, taken along line 4-4 in FIG. 3.

FIG. 3 shows a surface 212 of a component 200 including a plurality of shape memory alloy (SMA) particles 222, and FIG. 4 is a cross-sectional view of the component 200, taken along line 4-4 in FIG. 3. Various different components of the engine 100 contact a hydrocarbon fluid (e.g., fuels and oils) at elevated temperatures. The component 200 shown in FIG. 3 is one of these components in contact with a hydrocarbon fluid, and the component 200 may be, for example, a fuel line (e.g., a tube or pipe) of the fuel delivery assembly 153, the fuel nozzle 162, a swirler, an oil line of the main lubrication system 172 and the generator lubrication system 178, and/or any other component that is configured to be in contact with a hydrocarbon fluid, whether that component is in the engine 100 or another system. The component 200 includes a surface 212 that is configured to be in contact with the hydrocarbon fluid. The surface 212 is formed on a substrate 210 of the component 200. The component 200 may include, for example, a fluid passage 202 through which the hydrocarbon fluid flows, and the substrate 210 may be a containment wall. In such a case, the surface 212 may be a surface of the component 200 facing the fluid passage 202, and, thus, the surface 212 may be a wetted surface or a contact surface that is wetted/contacted by the hydrocarbon fluid in the fluid passage 202.

Typical materials used in the aircraft applications discussed above include stainless steel, corrosion-resistant alloys of nickel and chromium, and high-strength nickel-base alloys. The substrate 210 may be formed from a metal alloy chosen from the group consisting of iron-based alloys, nickel-based alloys, and chromium-based alloys. In a gas turbine engine, the component 200 and, in particular, the surface 212 may be exposed to elevated temperatures. Such elevated temperatures may include, for example, temperatures greater than three hundred degrees Fahrenheit and may include temperatures from six hundred degrees Fahrenheit to eight hundred degrees Fahrenheit. Exposed surfaces (the surface 212) of these components 200 using, for example, the metals discussed above may be susceptible to a significant build-up of coke at these temperatures, when in contact with the hydrocarbon fluid. During operation of the engine 100, the component 200 undergoes temperature cycling, also referred to herein as thermal cycling, from room temperature (e.g., pre-startup or post-cooldown conditions) to operating temperatures, and, then, even to higher temperatures after shutdown (e.g., soak back heating).

A coating of SMA particles 222 is applied to the surface 212 of the component 200 to break up any deposits, such as coke deposits, (see FIG. 5A) during the thermal cycling discussed above. The SMA particles 222 are applied in a layer that is metallurgically bonded to the substrate 210 and, more particularly, to the surface 212 of the substrate 210 forming a discontinuous layer of discrete particles. This discontinuous layer is referred to herein as an SMA coating 220. The SMA coating 220 includes a plurality of discrete SMA particles 222. In the embodiment shown in FIGS. 3 and 4, the SMA particles 222 are hemispherical particles arranged on the surface 212 with a distance d between each SMA particle 222. The SMA particles 222 may be any one of a plurality of materials generally recognized to fall within the class of "shape memory alloys." In the applications discussed herein, the shape memory alloy is preferably a high-temperature shape memory alloy. One suitable high-temperature shape memory alloy is, for example, a nickel-titanium alloy known under the trade name Nitinol®. Other suitable shape memory alloys include, for example, cobalt-nickel-aluminum alloys, nickel-iron-gallium alloys, iron-manganese-gallium alloys, and cobalt-nickel-gallium alloys. Like Nitinol®, the composition of these shape memory alloys can be tuned to have a transformation temperature in the range from room temperature (e.g., twenty degrees Celsius) to one hundred degrees Celsius. The shape memory alloy used preferably has a transformation temperature range appropriate for the thermal cycling discussed above, such that the surface 212 is configured to be exposed to thermal cycling passing through the transformation temperature range of the selected shape memory alloy.

Figure 5A:
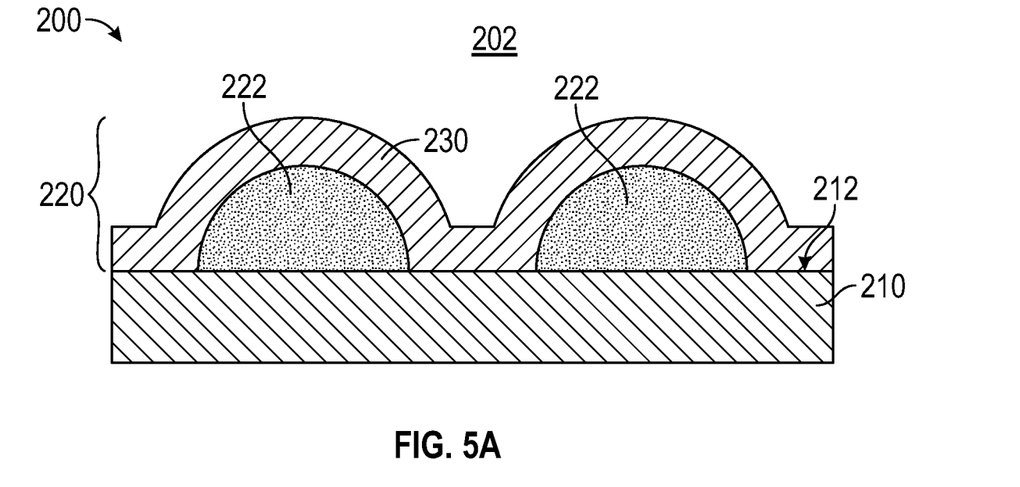
FIGS. 5A and 5B are schematic, cross-sectional views taken along line 4-4 in FIG. 3, illustrating the movement of the SMA particles of the SMA coating shown in FIG. 4.
Figure 5B:
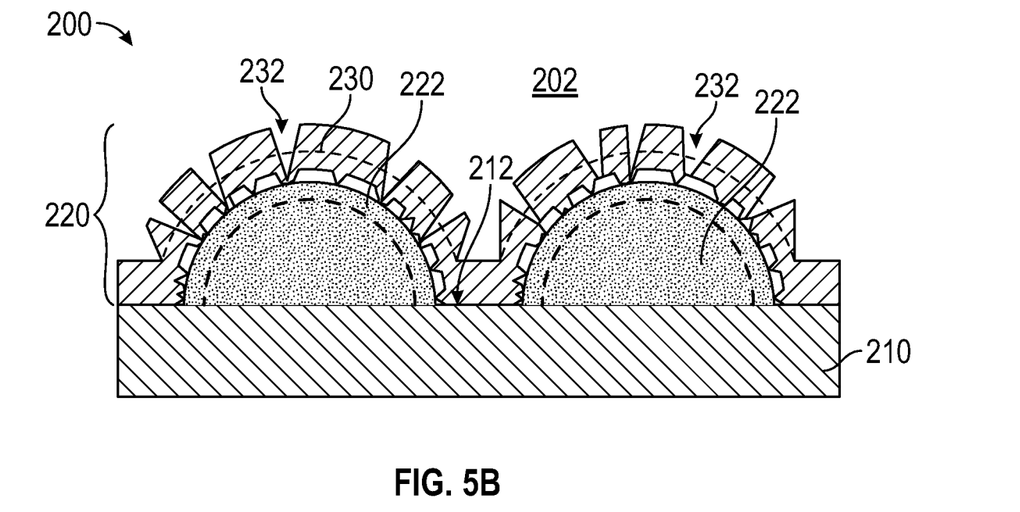

FIGS. 5A and 5B illustrate the thermal behavior of the SMA particles 222.

FIG. 5A is the initial state of the component 200 under a coking condition. A layer of a deposit, which in this embodiment is coke (coke layer 230), is formed on the surface 212 and the SMA particles 222. Shape memory alloys may undergo a phase change with changing (an increase or decrease) in temperature. Nitinol®, for example, may change between an austenitic phase and a martensitic phase. With this phase change, the SMA particles 222 will expand or contract with thermal expansion coefficients resulting from this phase change that are much greater than the coke layer 230. Thus, during an increase or a decrease in temperature of the surface 212, the SMA particles 222 will expand or contract such that the SMA particles 222 induces failure strains in the coke layer 230. FIG. 5A may illustrate a high temperature soak back condition in which the coke layer 230 forms. As the component 200 cools down, the SMA particles 222 may expand, for example, as a result of the phase change.

FIG. 5B shows the condition of the SMA particles 222 and coke layer 230 after the change in temperature and, more specifically, after the phase change of the shape memory alloy. In FIG. 5B, the initial size of the SMA particles 222 (size in FIG. 5A) is illustrated by the long-dashed line and the initial position of the coke layer 230 (position in FIG. 5A) is illustrated by the short-dashed line. When the SMA particles 222 expand, the coke layer 230 does not change to the same degree or extent as the SMA particles 222. The SMA particles 222 produce strains in the coke layer 230 that are large enough to delaminate, fracture, and form cracks 232 in the coke layer 230. As a result, the coke layer 230 breaks apart and can be removed by the hydrocarbon fluid flowing past the surface 212 during subsequent operation of the component 200. In one particular embodiment, the coke layer 230 is dislodged by delamination due to the shear forces induced at the interface of the coke layer 230 and the SMA particles 222 during thermal cycling. Because such thermal cycling may occur frequently with every mission cycle, the expansion/contraction of the SMA particles 222 prevents thick coke layers 230 from forming. This self-actuation by phase transformation-induced strains during thermal cycling is referred to herein as the self-cleaning effect of the SMA particles 222. This self-cleaning effect occurs during normal operating conditions and does not require external power. In addition, the self-cleaning effect is self-actuating and external activation, using, for example a sensor other feedback device, is not need. Moreover, as discussed above, the fluid flow removes the deposits. This self-cleaning effect is implemented in-situ, eliminating the need for maintenance stops.

Referring back to FIGS. 3 and 4, the SMA particles 222 are spaced apart from each other by a distance d (closest approach) when the SMA particles 222 are at a temperature in the initial state. To have the effect discussed above with respect to FIGS. 5A and 5B, the closest approach (distance d) of the SMA particles 222 should be sufficient to allow for the strains in the coke layer 230, as discussed above. In some embodiments, the SMA particles 222 may undergo a strain of ten percent during the thermal cycling discussed above. Each SMA particle 222 may have a width w, which in this embodiment is a diameter of the SMA particle 222, and, thus, the closest approach (distance d) of the SMA particles 222 may be ten percent of the particle diameter (width w) or greater. If the SMA particles 222 are placed too far apart, the SMA particles 222 may not sufficiently break up the coke layer 230 in order to avoid buildup of the coke layer 230. In some embodiments, the closest approach (distance d) of the SMA particles 222 may be the particle diameter or less. In some embodiments, the diameter of each SMA particle 222 may be from one micron to one hundred microns. In other embodiments, the diameter of each SMA particle 222 may be from one micron to ten microns, and, in further embodiments, the diameter of each SMA particle 222 may be from twenty microns to seventy microns. Each of the SMA particles 222 has a height h. The height h is the distance from the surface 212 to the uppermost portion of the SMA particle 222.

In some embodiments, the SMA particles 222 may have an aspect ratio of the height h to the width w of the SMA particle 222 at the surface 212, this aspect ratio may be twenty to one or less. Preferably, this aspect ratio is one to two or more. In some application where a discontinuous layer of the SMA particles 222 would have an adverse resistive effect on the flow of fluid (e.g., the hydrocarbon fluid), past the SMA coating 220, this aspect ratio may be optimized to values of two to one or less.

Figure 6:
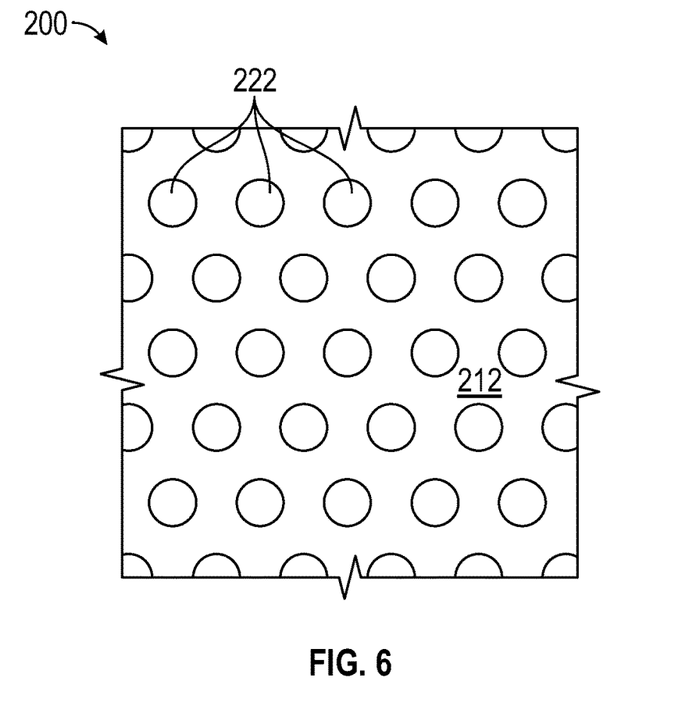
FIG. 6 shows a surface of a component including a SMA coating with an alternate distribution of the SMA particles.

The SMA particles 222 may be irregularly arranged on the surface 212, but the SMA particles 222 may also be arrayed in an ordered pattern (an ordered array) on the surface 212. In the embodiment shown in FIG. 3, the SMA particles 222 are arrayed in rows and columns. FIG. 6 shows another example of an ordered array. In this arrangement, one SMA particle 222 is positioned at an interstitial location between four SMA particles 222 that are aligned in rows and columns. Other suitable arrangements may be used including, for example, hexagonal packing. Whether in a pattern or irregularly spaced on the surface 212, the SMA coating 220 may have a surface density of the SMA particles 222. In some embodiments, the density of the SMA particles 222 on the surface 212 may be from twenty percent to ninety-five percent of the area of the surface 212. In other embodiments, the density of the SMA particles 222 on the surface 212 may be from twenty percent to seventy-four percent of the area of the surface 212.

Figure 7A:
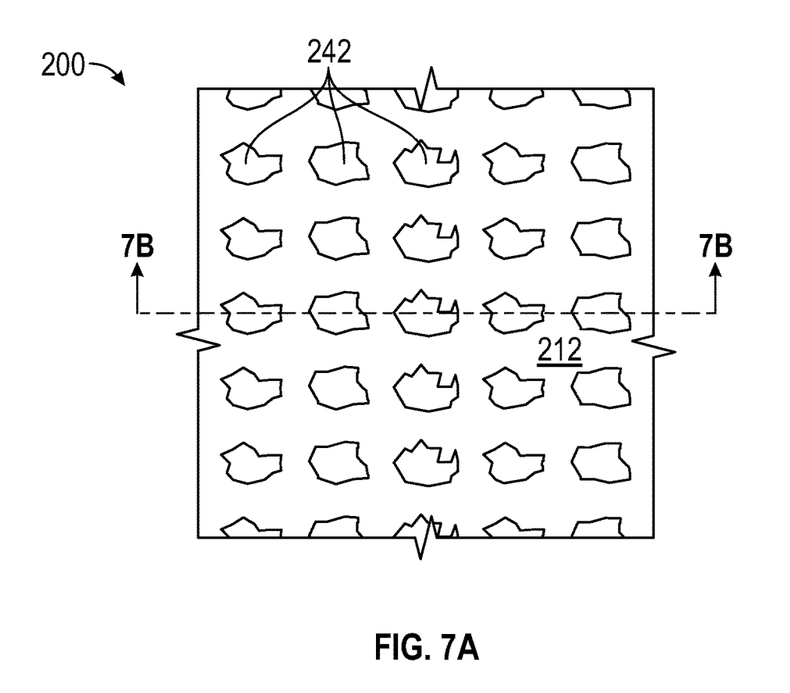
FIG. 7A shows a surface of a component including an SMA coating with an alternate geometry of SMA particles.
Figure 7B:
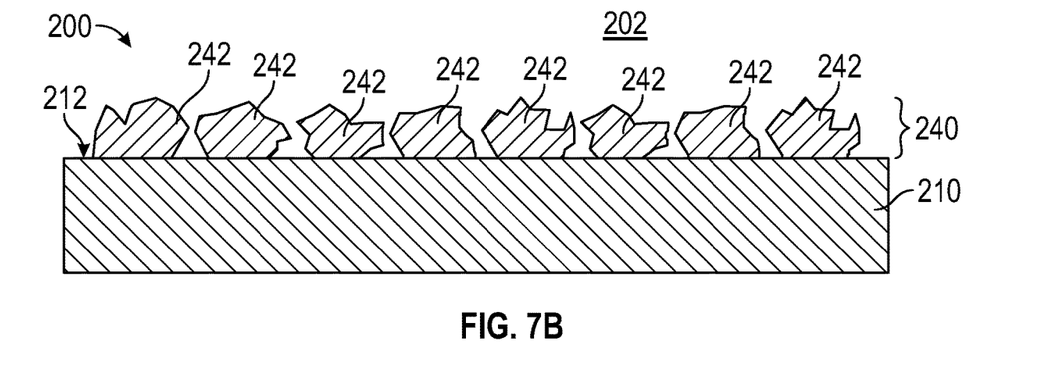
FIG. 7B is a cross-sectional view of the component with the SMA coating shown in FIG. 7A, taken along line 7B-7B in FIG. 7A.

FIGS. 7A and 7B show an SMA coating 240 according to another embodiment.

In the embodiments discussed above, the SMA particles 222 are hemispherical. The SMA particles 222, however, may have other suitable shapes. FIG. 7A shows the surface 212 of the component 200 including a plurality of SMA particles 242, and FIG. 7B is a cross-sectional view of the component 200, taken along line 7B-7B in FIG. 7A. The SMA coating 240 and the SMA particles 242 are the same as the SMA coating 220 and the SMA particles 222 discussed above, but the SMA particles 242 of this embodiment have an irregular shape. Although the width w of the irregularly-shaped SMA particles 242 may be taken at the interface between the SMA particles 242 and the substrate 210, the width w and height h (size) of the irregularly-shaped SMA particles 242 may be characterized by their median or average thickness and height, respectively.

Figure 8A:
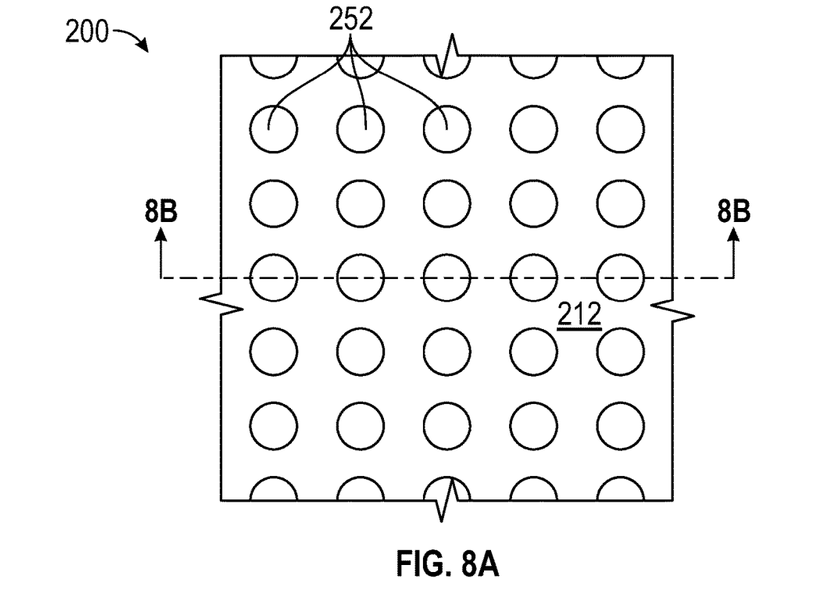
FIG. 8A shows a surface of a component including an SMA coating with an alternate geometry of SMA particles.
Figure 8B:
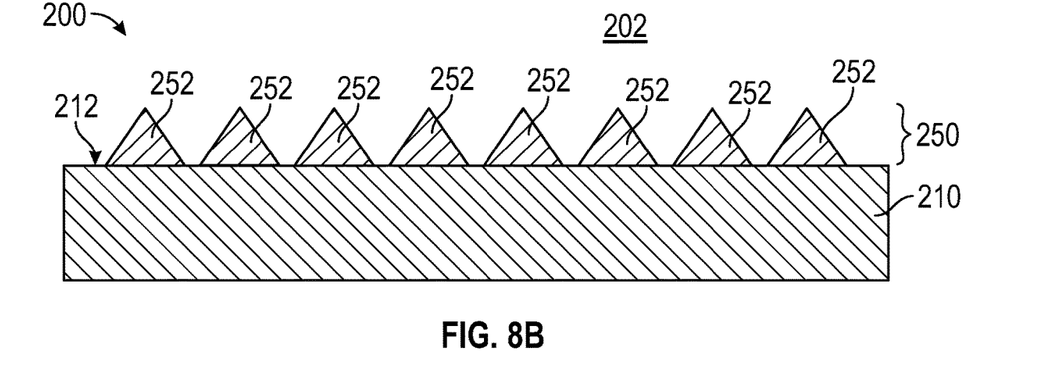
FIG. 8B is a cross-sectional view of the component with the SMA coating shown in FIG. 8A, taken along line 8B-8B in FIG. 8A.
Figure 8C:
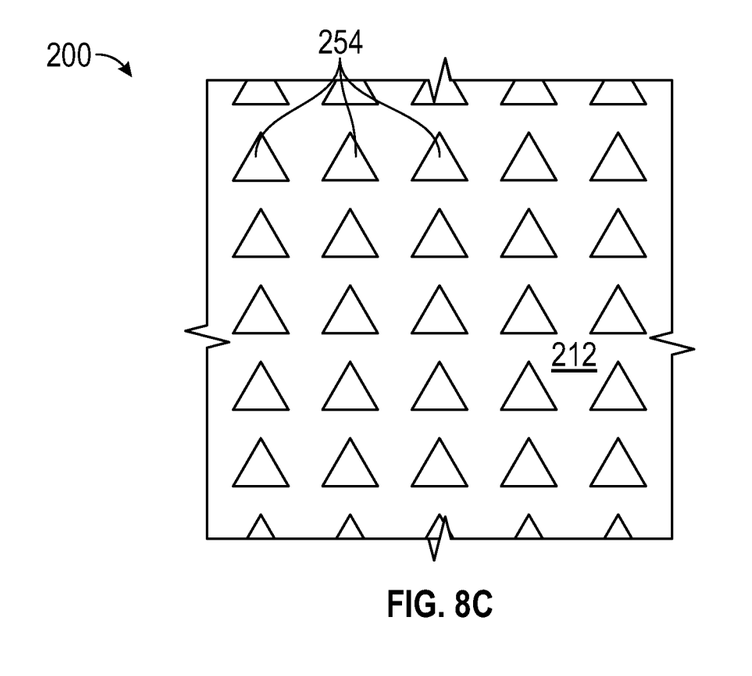
FIG. 8C shows a surface of a component including an SMA coating with an alternate geometry of SMA particles.
Figure 8D:
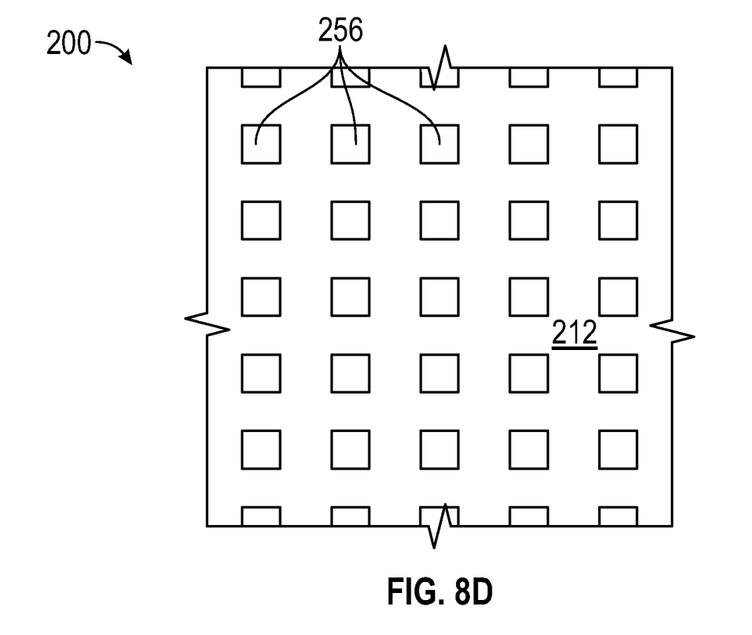
FIG. 8D shows a surface of a component including an SMA coating with an alternate geometry of SMA particles.

FIGS. 8A and 8B show an SMA coating 250 including a plurality of SMA particles 252 according to another embodiment. FIG. 8A shows the surface 212 of the component 200 including the plurality of SMA particles 252, and FIG. 8B is a cross-sectional view of the component 200, taken along line 8B-8B in FIG. 8A. The SMA coating 250 and the SMA particles 252 are the same as the SMA coating 220 and the SMA particles 222 discussed above, but the SMA particles 252 of this embodiment have a conical shape. FIG. 8C shows the surface 212 of the component 200 including a plurality of SMA particles 254 according to a further embodiment, and FIG. 8D shows the surface 212 of the component 200 including a plurality of SMA particles 256 according to an even further embodiment. The SMA particles 254, 256 shown in FIGS. 8C and 8D have a pyramidal shape, but are otherwise the same as the SMA particles 252 shown in FIGS. 8A and 8B. Pyramidal shapes may have any suitable base include those with triangular bases, as shown in FIG. 8C, and rectangular bases, as shown in FIG. 8D.

Figure 9A:
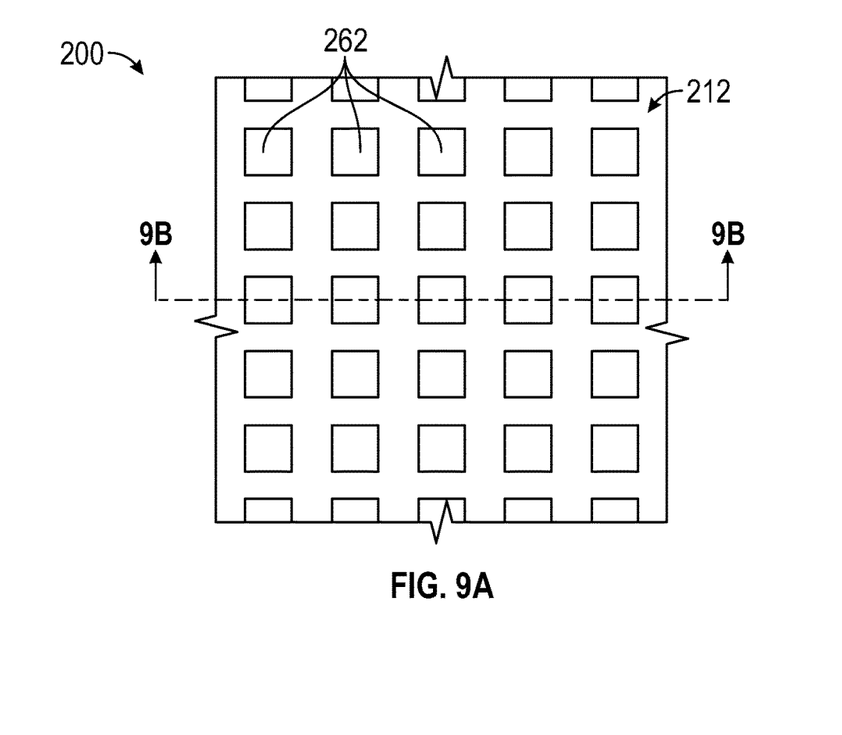
FIG. 9A shows a surface of a component including an SMA coating with an alternate geometry of SMA particles.
Figure 9B:
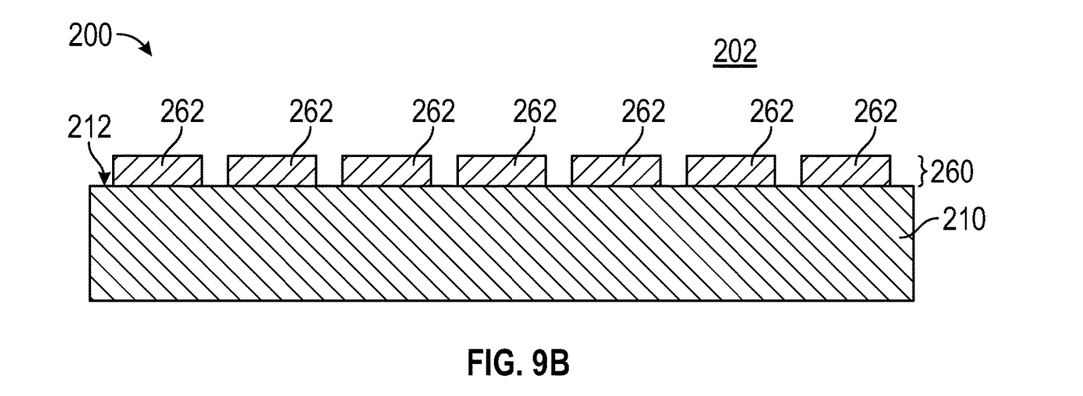
FIG. 9B is a cross-sectional view of the component with the SMA coating shown in FIG. 9A, taken along line 9B-9B in FIG. 9A.
Figure 9C:
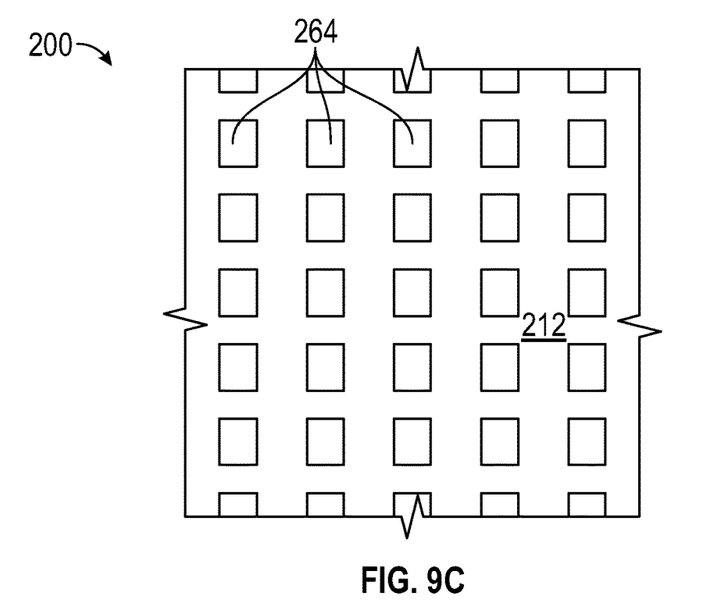
FIG. 9C shows a surface of a component including an SMA coating with an alternate geometry of SMA particles.

FIGS. 9A and 9B show an SMA coating 260 including a plurality of SMA particles 262 according to another embodiment. FIG. 9A shows the surface 212 of the component 200 including the plurality of SMA particles 262, and FIG. 9B is a cross-sectional view of the component 200, taken along line 9B-9B in FIG. 9A. The SMA coating 260 and the SMA particles 262 are the same as the SMA coating 220 and the SMA particles 222 discussed above, but the SMA particles 262 of this embodiment have a cuboidal shape and, more specifically in this embodiment, cubic. FIG. 9C shows the surface 212 of the component 200 including a plurality of SMA particles 264 according to a further embodiment. The SMA particles 264 shown in FIG. 9C is cuboidal having a rectangular base, but are otherwise the same as the SMA particles 262 shown in FIGS. 9A and 9B.

Figure 10:
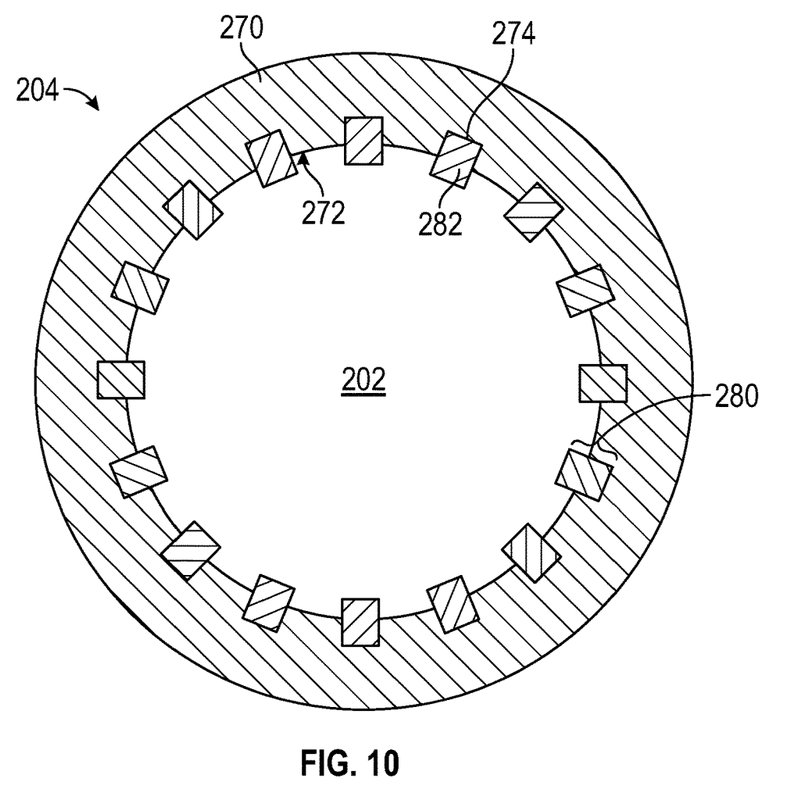
FIG. 10 shows component according to another embodiment including an SMA coating.

FIG. 10 shows component 204 according to another embodiment. The component 204 of this embodiment is similar to the component 200 discussed above and shows, more specifically, an annular component, such as a tube of the fuel delivery assembly 153, for example. The component 204 also includes a surface 272 of a substrate 270 that faces the fluid passage 202 through which the hydrocarbon fluid flows. The surface 272 of a substrate 270 is similar to the surface 212 of the substrate 210 discussed above. The component 204 also includes an SMA coating 280 including a plurality of SMA particles 282. The SMA particles 282 shown in FIG. 10 are similar to the SMA particles 262 discussed above with reference to FIGS. 9A and 9B, but any of the SMA particles discussed above may be used. In this embodiment, the surface 272 includes a plurality of recesses (or dimples) 274, and in this embodiment, a corresponding SMA particle 282 is positioned in each one of the recesses 274.

The components 200, 204 discussed herein and, more specifically, the surfaces 212, 272 may be susceptible to the formation of a deposit thereon. The embodiments discussed above used coke as an example deposit that is removed by the self-cleaning effect of the SMA particles 222, 242, 252, 254, 256, 262, 264, 282. The use of the SMA particles 222, 242, 252, 254, 256, 262, 264, 282 is not limited to these deposits, and the SMA particles 222, 242, 252, 254, 256, 262, 264, 282 may be formed on any surface subjected to thermal cycling and potential buildup of deposits. These other deposits may include, for example, oxidation, such as rust, as well as ash, hard dust, solids, scale condensed or precipitated from a gas or a liquid, or any combination thereof. The embodiments discussed herein employ an SMA coating 220, 240, 250, 260, 280 of SMA particles 222, 242, 252, 254, 256, 262, 264, 282 to avoid the buildup of such deposits by breaking up the deposits as they form, so that the deposits can be removed by the natural fluid flow past the surface. The SMA particles 222, 242, 252, 254, 256, 262, 264, 282 change shape under the normal operation of the component 200, 204 to which they are attached causing the deposits to break-up.

Further aspects of the present disclosure are provided by the subject matter of the following clauses.

A component susceptible to the formation of deposits. The component including a substrate and a plurality of particles. The substrate has a surface susceptible to the formation of a deposit thereon. The plurality of particles is formed on the surface of the substrate. The plurality of particles is formed from a shape memory alloy.

The component of the preceding clause, wherein the shape memory alloy is one of a nickel-titanium alloy, a cobalt-nickel-aluminum alloy, nickel-iron-gallium alloy, an iron-manganese-gallium alloy, or a cobalt-nickel-gallium alloy.

The component of any preceding clause, wherein each particle of the plurality of particles has a width. The width is from one micron to one hundred microns.

The component of any preceding clause, wherein the particles of the plurality of particles are irregularly arranged on the surface.

The component of any preceding clause, wherein the particles of the plurality of particles are arranged in an ordered array on the surface.

The component of any preceding clause, wherein each particle of the plurality of particles is irregularly shaped.

The component of any preceding clause, wherein each particle of the plurality of particles has a shape. The shape is one of hemispherical, conical, pyramidal, or cuboidal.

The component of any preceding clause, wherein each particle of the plurality of particles has (i) a width at the surface, (ii) a height projecting from the surface, and (iii) an aspect ratio of the height to the width. The aspect ratio is twenty to one or less.

The component of any preceding clause, wherein the substrate is a metal and each particle of the plurality of particles is metallurgically bonded to the surface.

The component of any preceding clause, wherein the substrate is formed from a metal alloy chosen from the group consisting of iron-based alloys, nickel-based alloys, and chromium-based alloys.

The component of any preceding clause, wherein the surface includes a plurality of recesses. A particle of the plurality of particles is located in each one of the plurality of recesses.

The component of any preceding clause, wherein shape memory alloy has a transformation temperature range. The surface is exposed to thermal cycling passing through the transformation temperature range.

The component of any preceding clause, wherein the deposit is at least one of coke, ash, hard dust, condensed scale, and precipitated scale.

The component of any preceding clause, wherein the surface is in contact with a hydrocarbon fluid.

The component of any preceding clause, wherein the surface is exposed to temperatures greater than three hundred degrees Fahrenheit.

The component of any preceding clause, wherein the surface is exposed to temperatures from six hundred degrees Fahrenheit to eight hundred degrees Fahrenheit.

The component of any preceding clause, wherein each particle of the plurality of particles is spaced apart from each other on the surface.

The component of any preceding clause, wherein each particle of the plurality of particles includes a particle diameter. Each particle of the plurality of particles is spaced apart from each other by a distance that is ten percent of the particle diameter or greater.

The component of any preceding clause, wherein each particle of the plurality of particles is spaced apart from each other by a distance that is a diameter of the particle or less.

The component of any preceding clause, wherein the surface has an area. The plurality of particles has a surface density on the surface. The surface density is from twenty percent to ninety-five percent of the area of the surface.

The component of any preceding clause, wherein the surface density is seventy-four percent of the area of the surface or less.

A gas turbine engine comprising a component of a hydrocarbon system. The component includes a fluid passage through which a hydrocarbon fluid flows, a substrate, and a plurality of particles. The substrate has a surface facing the fluid passage to be wetted by the hydrocarbon fluid. The plurality of particles is formed on the surface of the substrate. The plurality of particles is formed from a shape memory alloy.

The gas turbine engine the preceding clause, wherein the shape memory alloy is one of a nickel-titanium alloy, a cobalt-nickel-aluminum alloy, nickel-iron-gallium alloy, an iron-manganese-gallium alloy, or a cobalt-nickel-gallium alloy.

The gas turbine engine any preceding clause, wherein each particle of the plurality of particles has a width. The width is from one micron to one hundred microns.

The gas turbine engine any preceding clause, wherein the particles of the plurality of particles are irregularly arranged on the surface.

The gas turbine engine any preceding clause, wherein the particles of the plurality of particles are arranged in an ordered array on the surface.

The gas turbine engine any preceding clause, wherein each particle of the plurality of particles is irregularly shaped.

The gas turbine engine any preceding clause, wherein each particle of the plurality of particles has a shape, the shape being one of hemispherical, conical, pyramidal, or cuboidal.

The gas turbine engine any preceding clause, wherein each particle of the plurality of particles has (i) a width at the surface, (ii) a height projecting from the surface, and (iii) an aspect ratio of the height to the width. The aspect ratio is twenty to one or less.

The gas turbine engine any preceding clause, wherein the substrate is a metal and each particle of the plurality of particles is metallurgically bonded to the surface.

The gas turbine engine any preceding clause, wherein the substrate is formed from a metal alloy chosen from the group consisting of iron-based alloys, nickel-based alloys, and chromium-based alloys.

The gas turbine engine any preceding clause, wherein the surface includes a plurality of recesses. A particle of the plurality of particles is located in each one of the plurality of recesses.

The gas turbine engine any preceding clause, wherein the shape memory alloy has a transformation temperature range, and the surface is exposed to thermal cycling passing through the transformation temperature range.

The gas turbine engine any preceding clause, wherein the surface is exposed to temperatures greater than three hundred degrees Fahrenheit.

The gas turbine engine any preceding clause, wherein the surface is exposed to temperatures from six hundred degrees Fahrenheit to eight hundred degrees Fahrenheit.

The gas turbine engine any preceding clause, wherein the hydrocarbon fluid is fuel, and the component is at least one of a fuel line and a fuel nozzle.

gas turbine engine any preceding clause, wherein the hydrocarbon fluid is oil, and the component is an oil line.

The gas turbine engine any preceding clause, wherein each particle of the plurality of particles is spaced apart from each other on the surface.

The gas turbine engine any preceding clause, wherein each particle of the plurality of particles includes a particle diameter, and each particle of the plurality of particles is spaced apart from each other by a distance that is ten percent of the particle diameter or greater.

The gas turbine engine any preceding clause, wherein each particle of the plurality of particles is spaced apart from each other by a distance that is a diameter of the particle or less.

The gas turbine engine any preceding clause, wherein the surface has an area, and the plurality of particles has a surface density on the surface, the surface density being from twenty percent to ninety-five percent of the area of the surface.

The gas turbine engine any preceding clause, wherein the surface density is seventy-four percent of the area of the surface or less.

Although the foregoing description is directed to the preferred embodiments, other variations and modifications will be apparent to those skilled in the art, and may be made without departing from the spirit or the scope of the disclosure. Moreover, features described in connection with one embodiment may be used in conjunction with other embodiments, even if not explicitly stated above.

The invention claimed is:

1. A gas turbine engine comprising a component of a hydrocarbon system, the component including:
 a fluid passage through which a hydrocarbon fluid flows;
 a substrate having a surface facing the fluid passage to be wetted by the hydrocarbon fluid; and
 a shape memory alloy coating formed on the surface of the substrate, the shape memory alloy coating being a plurality of particles formed on the surface, and each particle of the plurality of particles being formed from a shape memory alloy.

2. The gas turbine engine of claim 1, wherein the shape memory alloy is one of a nickel-titanium alloy, a cobalt-nickel-aluminum alloy, nickel-iron-gallium alloy, an iron-manganese-gallium alloy, or a cobalt-nickel-gallium alloy.

3. The gas turbine engine of claim 1, wherein each particle of the plurality of particles is irregularly shaped.

4. The gas turbine engine of claim 1, wherein the substrate is formed from a metal alloy chosen from the group consisting of iron-based alloys, nickel-based alloys, and chromium-based alloys.

5. The gas turbine engine of claim 1, wherein the hydrocarbon fluid is fuel, and the component is at least one of a fuel line and a fuel nozzle.

6. The gas turbine engine of claim 1, wherein the hydrocarbon fluid is oil, and the component is an oil line.

7. The gas turbine engine of claim 1, wherein each particle of the plurality of particles includes a particle diameter, and each particle of the plurality of particles is spaced apart from each other by a distance that is ten percent of the particle diameter or greater and is a diameter of the particle or less.

8. The gas turbine engine of claim 1, wherein each particle of the plurality of particles is spaced apart from each other on the surface, and
   wherein the surface has an area, and the plurality of particles has a surface density on the surface, the surface density being from twenty percent to ninety-five percent of the area of the surface.

9. A component susceptible to the formation of deposits, the component comprising:
   a substrate having a surface susceptible to the formation of a deposit thereon; and
   a shape memory alloy coating formed on the surface of the substrate, the shape memory alloy coating being a plurality of particles formed on the surface, and each particle of the plurality of particles being formed from a shape memory alloy.

10. The component of claim 9, wherein the shape memory alloy is one of a nickel-titanium alloy, a cobalt-nickel-aluminum alloy, nickel-iron-gallium alloy, an iron-manganese-gallium alloy, or a cobalt-nickel-gallium alloy.

11. The component of claim 9, wherein the particles of the plurality of particles are irregularly arranged on the surface.

12. The component of claim 9, wherein the particles of the plurality of particles are arranged in an ordered array on the surface.

13. The component of claim 9, wherein each particle of the plurality of particles is irregularly shaped.

14. The component of claim 9, wherein each particle of the plurality of particles has a shape, the shape being one of hemispherical, conical, pyramidal, or cuboidal.

15. The component of claim 9, wherein each particle of the plurality of particles has (i) a width at the surface, (ii) a height projecting from the surface, and (iii) an aspect ratio of the height to the width, the aspect ratio being twenty to one or less.

16. The component of claim 9, wherein the surface includes a plurality of recesses, a particle of the plurality of particles being located in each one of the plurality of recesses.

17. The component of claim 9, wherein each particle of the plurality of particles is spaced apart from each other on the surface.

18. The component of claim 17, wherein the surface has an area, and the plurality of particles has a surface density on the surface, the surface density being from twenty percent to ninety-five percent of the area of the surface.

19. The component of claim 17, wherein each particle of the plurality of particles includes a particle diameter, and each particle of the plurality of particles is spaced apart from each other by a distance that is ten percent of the particle diameter or greater.

20. The component of claim 19, wherein each particle of the plurality of particles is spaced apart from each other by a distance that is a diameter of the particle or less.

* * * * *